US008000690B2

(12) United States Patent
Borcic et al.

(10) Patent No.: US 8,000,690 B2
(45) Date of Patent: *Aug. 16, 2011

(54) INTERRUPTING AND RESUMING A MEDIA PLAYER

(75) Inventors: Rob Borcic, Pittsburg, CA (US); Angus Davis, Pleasant Hill, CA (US); Chris Thilgen, San Francisco, CA (US); Govind Balakrishnan, Foster City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/651,841

(22) Filed: Jan. 4, 2010

(65) Prior Publication Data
US 2010/0105361 A1  Apr. 29, 2010

Related U.S. Application Data

(63) Continuation of application No. 11/323,807, filed on Dec. 31, 2005, now Pat. No. 7,660,558.

(51) Int. Cl.
*H04M 3/42* (2006.01)
(52) U.S. Cl. ............... 455/414.1; 455/3.06; 455/67.11; 455/418
(58) Field of Classification Search .............. 455/3.06, 455/419, 414.1, 552.1, 418, 420, 3.01, 454, 455/414.3, 517, 67.11; 725/39, 75
See application file for complete search history.

(56) References Cited

U.S. PATENT DOCUMENTS

| | | |
|---|---|---|
| 5,797,098 A | 8/1998 | Schroeder et al. |
| 6,188,401 B1 | 2/2001 | Peyer |
| 6,195,569 B1 | 2/2001 | Frederiksen |
| 6,292,099 B1 | 9/2001 | Tse et al. |
| 6,381,468 B1 | 4/2002 | Larsen et al. |
| 6,529,744 B1 | 3/2003 | Birkler et al. |
| 6,729,929 B1 | 5/2004 | Sayers et al. |
| 6,732,358 B1 | 5/2004 | Siefert |
| 6,757,372 B1 | 6/2004 | Dunlap et al. |
| 6,775,362 B1 | 8/2004 | Ransom |
| 6,892,067 B1 | 5/2005 | Sharma et al. |
| 6,928,468 B2 | 8/2005 | Leermakers |
| 6,964,061 B2 | 11/2005 | Cragun et al. |
| 6,976,217 B1 | 12/2005 | Vertaschitsch et al. |
| 6,983,421 B1 | 1/2006 | Lahti et al. |
| 7,003,327 B1 | 2/2006 | Payne et al. |
| 7,035,629 B2 | 4/2006 | Fujii |
| 7,096,474 B2 | 8/2006 | Wong et al. |
| 7,099,685 B2 | 8/2006 | Park et al. |
| 7,142,977 B2 | 11/2006 | Knuuttila et al. |
| 7,152,203 B2 | 12/2006 | Gao et al. |
| 7,158,788 B2 | 1/2007 | Holler et al. |

(Continued)

OTHER PUBLICATIONS

Binary Runtime Environment for Wireless—BREW™ 2.1 API Reference, QUALCOMM Incorporated, San Diego, CA, May 8, 2003, cover, copyright and pp. 376-416.

(Continued)

*Primary Examiner* — John J Lee
(74) *Attorney, Agent, or Firm* — Fish & Richardson P.C.

(57) ABSTRACT

In an embodiment, a method is provided. The method includes playing a content file with a media player on a cellular telephone. Also, the method includes receiving an interrupt event. Moreover, the method includes saving state of the media player on the cellular telephone in the media player.

17 Claims, 11 Drawing Sheets

U.S. PATENT DOCUMENTS

| | | |
|---|---|---|
| 7,159,500 B2 | 1/2007 | John et al. |
| 7,165,099 B2 | 1/2007 | Sprigg et al. |
| 7,167,728 B1 | 1/2007 | Wagner et al. |
| 7,187,948 B2 | 3/2007 | Alden |
| 7,243,164 B2 | 7/2007 | Vegge |
| 7,275,243 B2 | 9/2007 | Gibbons et al. |
| 7,283,841 B2 | 10/2007 | Luke et al. |
| 7,299,289 B1 | 11/2007 | Lorenz et al. |
| 7,299,409 B2 | 11/2007 | Joshi et al. |
| 7,310,784 B1 | 12/2007 | Gottlieb et al. |
| 7,316,003 B1 | 1/2008 | Dulepet et al. |
| 7,319,862 B1 | 1/2008 | Lincoln et al. |
| 7,478,158 B1 | 1/2009 | Rodgers et al. |
| 7,480,422 B2 | 1/2009 | Ackley et al. |
| 7,603,113 B2 | 10/2009 | Borcic et al. |
| 7,634,559 B2 | 12/2009 | Brown |
| 7,639,943 B1 | 12/2009 | Kalajan |
| 2002/0140729 A1 | 10/2002 | Price et al. |
| 2002/0152239 A1 | 10/2002 | Bautista-Lloyd et al. |
| 2002/0161634 A1 | 10/2002 | Kaars |
| 2002/0161796 A1 | 10/2002 | Sylthe |
| 2003/0105845 A1 | 6/2003 | Leermakers |
| 2003/0167318 A1 | 9/2003 | Robbin et al. |
| 2004/0034853 A1 | 2/2004 | Gibbons et al. |
| 2004/0104938 A1 | 6/2004 | Saraswat et al. |
| 2004/0203384 A1 | 10/2004 | Sugikawa et al. |
| 2004/0215652 A1 | 10/2004 | Muller et al. |
| 2004/0260652 A1 | 12/2004 | Rose |
| 2005/0090246 A1 | 4/2005 | Leermakers |
| 2005/0131837 A1 | 6/2005 | Sanctis et al. |
| 2005/0172154 A1* | 8/2005 | Short et al. ............ 713/201 |
| 2005/0215238 A1 | 9/2005 | Macaluso |
| 2005/0226188 A1 | 10/2005 | Santhoff et al. |
| 2005/0246193 A1 | 11/2005 | Roever et al. |
| 2005/0246703 A1 | 11/2005 | Ahonen |
| 2005/0246726 A1 | 11/2005 | Labrou et al. |
| 2005/0266884 A1 | 12/2005 | Marriott et al. |
| 2006/0013502 A1 | 1/2006 | Weigand |
| 2006/0015819 A1 | 1/2006 | Hawkins et al. |
| 2006/0026304 A1 | 2/2006 | Price |
| 2006/0123360 A1 | 6/2006 | Anwar et al. |
| 2006/0153040 A1 | 7/2006 | Girish et al. |
| 2006/0165104 A1 | 7/2006 | Kaye |
| 2006/0171515 A1 | 8/2006 | Hintermeister et al. |
| 2006/0184968 A1* | 8/2006 | Clayton et al. ............ 725/56 |
| 2006/0200815 A1 | 9/2006 | Li |
| 2006/0206918 A1 | 9/2006 | Mclean |
| 2006/0224943 A1 | 10/2006 | Snyder et al. |
| 2006/0250578 A1 | 11/2006 | Pohl et al. |
| 2006/0252462 A1 | 11/2006 | Balakrishnan et al. |
| 2006/0256130 A1 | 11/2006 | Gonzalez |
| 2006/0265508 A1 | 11/2006 | Angel et al. |
| 2007/0026799 A1 | 2/2007 | Wang et al. |
| 2007/0038931 A1 | 2/2007 | Allaire et al. |
| 2007/0130331 A1 | 6/2007 | Kao et al. |
| 2007/0155310 A1 | 7/2007 | Borcic et al. |
| 2007/0155425 A1 | 7/2007 | Balakrishnan et al. |
| 2007/0155426 A1 | 7/2007 | Balakrishnan et al. |
| 2007/0156841 A1 | 7/2007 | Balakrishnan et al. |
| 2007/0157194 A1 | 7/2007 | Balakrishnan et al. |
| 2007/0220504 A1 | 9/2007 | Eker |
| 2007/0277230 A1 | 11/2007 | Hawkins et al. |
| 2008/0059533 A1 | 3/2008 | Krikorian |
| 2008/0077956 A1 | 3/2008 | Morrison et al. |
| 2008/0147671 A1 | 6/2008 | Simon et al. |
| 2008/0222520 A1 | 9/2008 | Balakrishnan et al. |
| 2008/0261657 A1 | 10/2008 | Amit |
| 2008/0268911 A1 | 10/2008 | Eronen et al. |
| 2009/0031418 A1 | 1/2009 | Matsuda et al. |
| 2009/0042599 A1 | 2/2009 | Scott |
| 2009/0094272 A1 | 4/2009 | Skriletz |

OTHER PUBLICATIONS

Chanda, "Embedded Document within an Application," Pending patent U.S. Appl. No. 11/567,111, filed Dec. 5, 2006, 24 pages.

Hosmer, et al., "System and Method for Developing Information for a Wireless Information System," Pending patent U.S. Appl. No. 10/791,299, filed Mar. 1, 2004, 26 pages.

Morris, et al., "Mobile Rich Media Information System," Pending patent U.S. Appl. No. 10/791,298, filed Mar. 1, 2004, 43 pages.

Notification of Transmittal of the International Search Report and the Written Opinion of the International Searching Authority, or the Declaration for Application No. PCT/2008/056278, dated Aug. 12, 2009, 15 pages.

* cited by examiner

INTERRUPTING AND RESUMING A MEDIA PLAYER

CROSS-REFERENCE TO RELATED APPLICATIONS

This application is a continuation application and claims the benefit of priority under 35 U.S.C. Section 120 of U.S. application Ser. No. 11/323,807, filed on Dec. 31, 2005. The disclosure of the prior application is considered part of and is incorporated by reference in the disclosure of this application.

BACKGROUND

Cellular telephones have steadily advanced in terms of processor power and associated resources such as memory. Cellular telephones have correspondingly moved from primitive user interfaces and operating systems to more advanced software. Along the way, this has resulted in enhanced capabilities of cellular telephones, such as playing media in various forms.

Media players are now available for cellular telephones, allowing for display of videos, viewing of still pictures, and broadcasting of audio. However, the data encoding media can be encoded in a bewildering array of different formats. Codecs are used for such operations. Codecs are generally software modules which can encode data from a raw format into a generally compressed format, and then can decode such data to allow for processing of the raw data when it is used. However, as codecs perform compression (mainly), the options for implementing codecs are as limitless as the options for compression. Considerations such as encoded data size (space efficiency), time to encode data (time efficiency), and data integrity (lossiness—many compression algorithms lose some data) all come into play when selecting a method for encoding (and decoding) data, and a corresponding codec.

Users are, understandably, not terribly interested in such details. A typical user of a cellular telephone may have no idea of what codecs are available on the phone. The user wants the result, whether that result is being able to display a picture, view a video, or play a popular sound as a ringtone. Thus, it may be useful to provide a system and method allowing for use of local codecs on a cellular telephone, rather than requiring a designated codec to exist on the cellular telephone to play multimedia content.

While playing this content, whether video or still pictures, the cellular phone may be used for its original purpose—a call may arrive. Other interrupts may also occur, such as an SMS message arriving or voicemail notification occurring. Additional interrupt events may also be understood. Thus, it may be useful to be able to halt playing of media and to later resume playing of media. For some users, involved with playing games through a media player, being able to suspend the game rather than lose progress may be considered particularly important.

SUMMARY

In an embodiment, a method is provided. The method includes playing a content file with a media player on a cellular telephone. Also, the method includes receiving an interrupt event. Moreover, the method includes saving state of the media player on the cellular telephone in the media player.

In another embodiment, a system is provided. The system includes a cellular telephone. The cellular telephone includes a processor. The cellular telephone also includes a display coupled to the processor and a network interface coupled to the processor. Moreover, the cellular telephone includes a local storage medium coupled to the processor and a media player embodied in the local storage medium. The media player is to play content in content files, and the media player is to save state data within the media player as embodied in the local storage medium.

In still another embodiment, a method is provided. The method includes accessing a media player on a cellular telephone with state data saved in the media player. The method further includes querying a user as to whether to resume play of a content file identified in the state data saved in the media player. The method also includes operating the media player responsive to a result of querying the user as to whether to resume play.

BRIEF DESCRIPTION OF THE DRAWINGS

The present invention is illustrated in an exemplary manner by the accompanying drawings. The drawings should be understood as exemplary rather than limiting, as the scope of the invention is defined by the claims.

DETAILED DESCRIPTION

Figure 1:
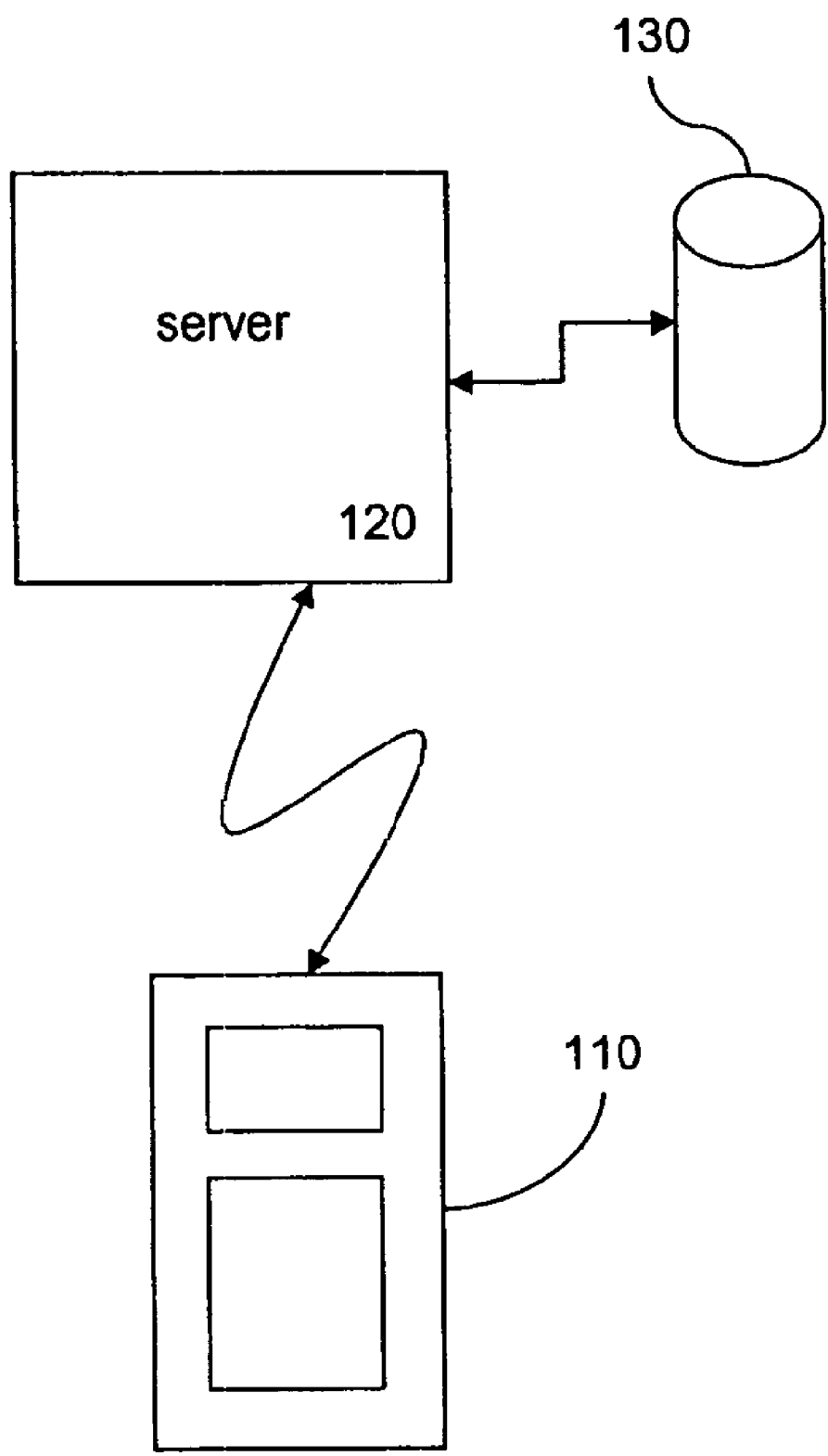
FIG. 1 illustrates an embodiment of a personal device such as a cellular telephone.

A method and apparatus for interrupting and resuming a media player is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

The specific embodiments described in this document represent exemplary instances of the present invention, and are illustrative in nature rather than restrictive in terms of the scope of the present invention. The scope of the invention is defined by the claims. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

In one embodiment, a method is provided. The method includes determining what codecs are present on a cellular telephone. The method also includes retrieving a data file corresponding to one of the codecs on the cellular telephone. The method further includes playing the data file using one of the codecs of the cellular telephone. Playing may involve decoding the data to data presentable on a user interface.

In another embodiment, a system is provided. The system includes a cellular telephone. The cellular telephone includes a processor. The cellular telephone also includes a display coupled to the processor. Additionally, the cellular telephone includes a network interface coupled to the processor. Moreover, the cellular telephone includes a local storage medium coupled to the processor. Also, the cellular telephone includes a set of codecs embodied in the local storage medium. Likewise, the cellular telephone includes a media player embodied in the local storage medium. The media player is to play content in content files. The content files have references to encoded media. The media player is to access encoded media through the network interface based on codecs of the set of codecs.

In yet another embodiment, a method of playing encoded media referred to in a content file played by a media player on a cellular telephone is provided. The method includes evaluating local codecs of the cellular telephone. The method also includes playing the content file. Furthermore, the method includes accessing encoded media referred to by the content file in a format determined based on local codecs of the cellular telephone. Also, the method includes playing the encoded media with the media player using a local codec of the cellular telephone.

In still another embodiment, a method is provided. The method includes evaluating local codecs of a cellular telephone. The method further includes playing a content file with a media player on the cellular telephone. The method also includes accessing encoded media referred to by the content file in a format determined based on local codecs of the cellular telephone.

In an embodiment, a method is provided. The method includes playing a content file with a media player on a cellular telephone. Also, the method includes receiving an interrupt event. Moreover, the method includes saving state of the media player on the cellular telephone in the media player.

In another embodiment, a system is provided. The system includes a cellular telephone. The cellular telephone includes a processor. The cellular telephone also includes a display coupled to the processor and a network interface coupled to the processor. Moreover, the cellular telephone includes a local storage medium coupled to the processor and a media player embodied in the local storage medium. The media player is to play content in content files, and the media player is to save state data within the media player as embodied in the local storage medium.

In still another embodiment, a method is provided. The method includes accessing a media player on a cellular telephone with state data saved in the media player. The method further includes querying a user as to whether to resume play of a content file identified in the state data saved in the media player. The method also includes operating the media player responsive to a result of querying the user as to whether to resume play.

Illustration and description of various embodiments may provide more insight. FIG. 1 illustrates an embodiment of a personal device such as a cellular telephone. System 100 includes a cellular telephone, a server, and a repository of information at the server. Cellular device 110 may be a telephone or similar personal device incorporating a cellular telephone. Server 120 may be a networked computer or machine which can interact with the cellular telephone 110. Repository 130 may be a relational database or other storage facility for data at the server 120.

Figure 2:
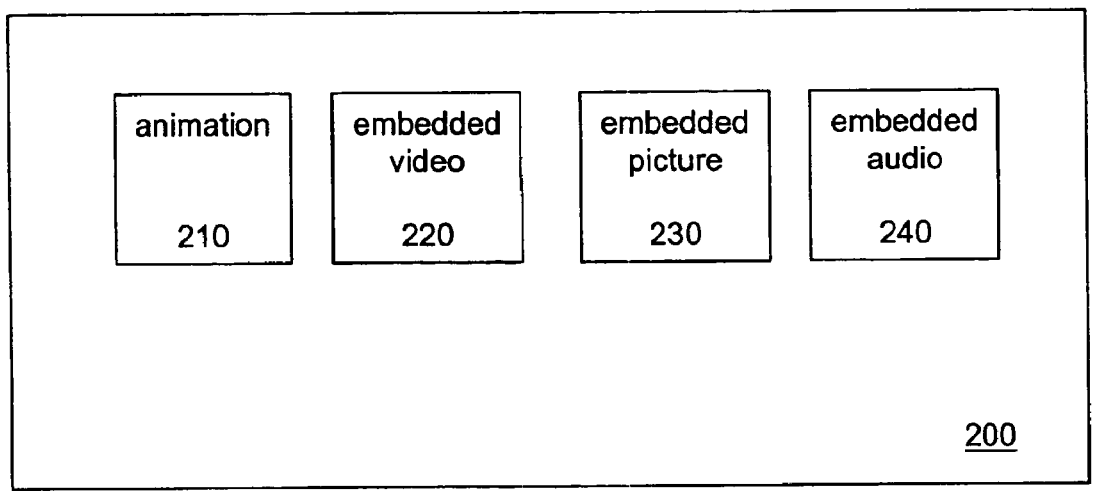
FIG. 2 illustrates an embodiment of a content file.

In operating a cellular telephone, content files may be used. FIG. 2 illustrates an embodiment of a content file. Content file 200 may provide a variety of different types of functionality, such as a simple animation or a complex user interface, for example. Content file 200 includes animation, a reference to video content, a reference to still picture content and a reference to audio content. Animation 210 is a self-contained part of content file 200. Video reference 220 includes information about the video data referenced, and a reference to where the video data can be found. Similarly, still picture reference 230 includes information about the picture and a reference to where the picture can be found. Likewise, audio reference 240 includes information about the embedded audio data and a reference to where the embedded audio data can be found. Note that these references are dynamic in nature—they allow for flexibility at several levels. On one level, new content can be substituted in a particular content file by changing the reference to a different source of media. On another level, new content can be introduced by changing what content is available at the location where the reference points to—what content is stored there. Thus, a video file with corrupt data or with some sort of a glitch (a missing I-frame in an MPEG file for example) could be replaced with a properly formatted file.

Figure 3:
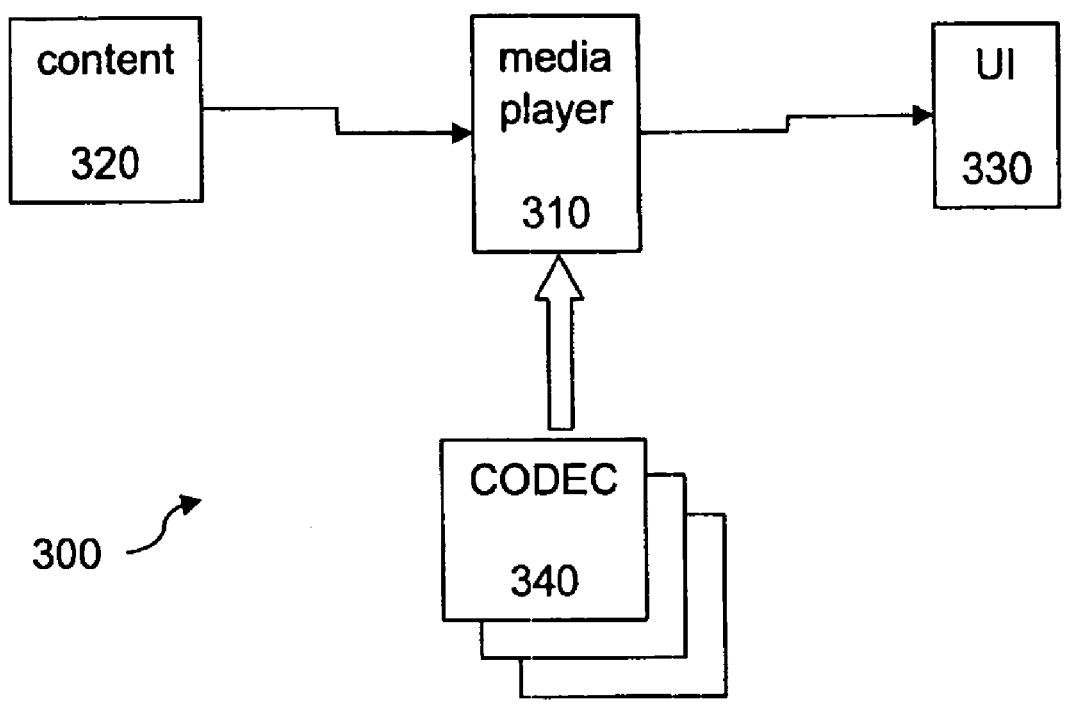
FIG. 3 illustrates an embodiment of a media player and associated modules on a cellular telephone.

A content file is played by a media player. FIG. 3 illustrates an embodiment of a media player and associated modules on a cellular telephone. Media player 310 plays a content file such as content 320 and displays the results on user interface 310 (typically a screen, although this may include speakers for audio content). For embedded data, codecs 340 are used. Codecs 340 are compression/decompression (or encoding/decoding) modules which are designed to accept well-defined input data (with a predetermined structure) and provide output data in a standard format. Thus, a codec for a PNG formatted image would accept PNG formatted input data and provide raw picture data as an output format, for example.

Figure 4:
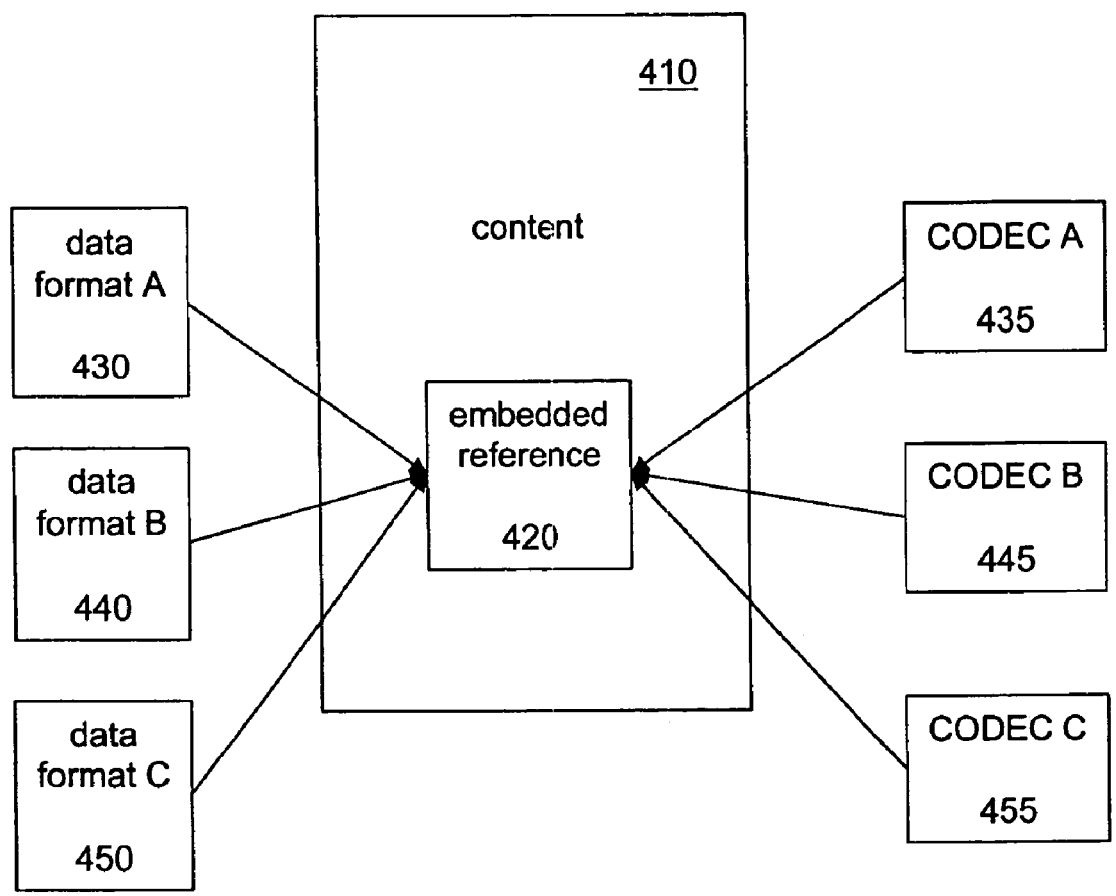
FIG. 4 illustrates an embodiment of a content file and associated components including encoded media and codecs.

A further illustration of various codecs may be helpful. FIG. 4 illustrates an embodiment of a content file and associated components including encoded media and codecs. Content fill 410 includes embedded reference 420 to a piece of encoded data. The encoded data is available in three different formats, format A (430), format B (440) and format C (450). Each of these formats corresponds to a well-defined codec, with format A 430 corresponding to codec A 435, format B 440 corresponding to codec B 445 and format C 450 corresponding to codec C 455. Thus, if the embedded reference 420 is resolved to use data format B 440, codec B 445 would be the appropriate codec for decoding the data.

Note that many different codecs are available. Moreover, codecs often have overlapping capabilities—such that multiple codecs can produce (encode) data formatted as a Windows Media formatted file (typically a .wmv file on personal computers), for example. However, such codecs are not always compatible with each other. Thus, a Windows Media formatted file may be produced by a first codec, but when a second codec is used to decode the file, the results may be one of correct, incorrect but displayable (with errors/mistranslations of the data), or so incorrect as to be corrupted (not displayable). Similar results can occur with still pictures and with audio files.

Thus, using codecs available locally on a device can be helpful, as one may expect that the codecs will operate properly and media content will be displayed properly. The user experience can be expected to generally be uniform, as the media data presented will be provided in a manner useful for the device in question. This also presents opportunities for customizing or personalizing user experience, and provides for skinning or other modifications of media on particular devices. A codec which always overlays an image of a picture frame can be used, for example.

Figures 5A, 5B:
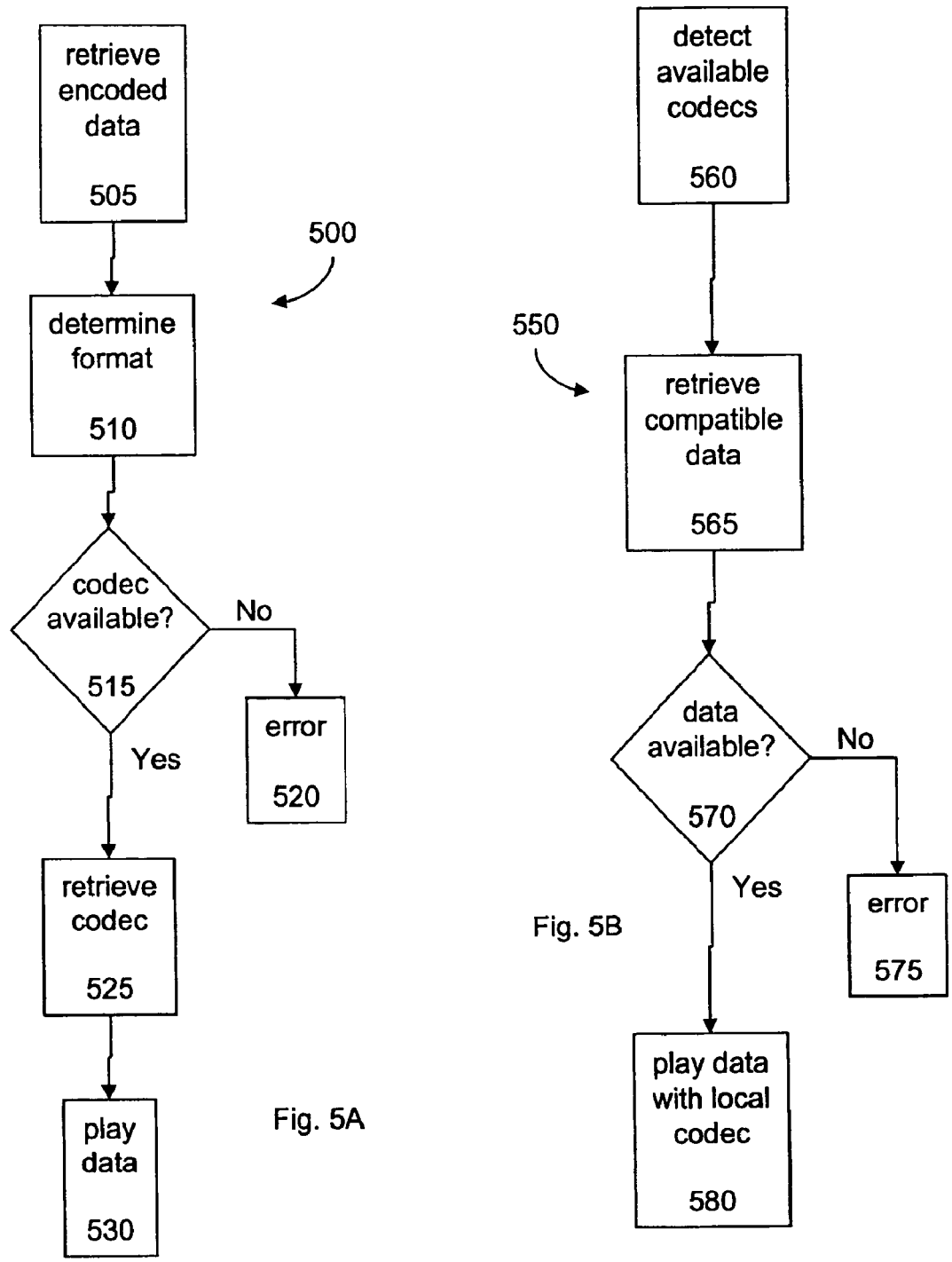
FIG. 5A illustrates an embodiment of a process of retrieving and playing encoded data.
FIG. 5B illustrates another embodiment of a process of retrieving and playing encoded data.

One process for use of codecs involves determining what data format is available and then determining if a relevant codec is available. FIG. 5A illustrates an embodiment of a process of retrieving and playing encoded data. Process 500, and other processes described in this document are made up of modules. These modules may be reordered in some instances, and may be combined or subdivided in various embodiments. Moreover, such modules may be implemented as process modules, software modules, or other modules.

Process 500 includes retrieving encoded data, determining a format of the data, determining if a relevant codec is available, retrieving the codec and playing the data if possible, and failing if not possible. Process 500 initiates at module 505 with retrieval of encoded data in a predetermined format. The format is determined from the data at module 510. At module 515, a determination is made as to whether a codec for the format of module 510 is available. If not, at module 520, an error is signaled and the process fails—the data may not be decoded.

If a codec is available, at module 525, the codec is retrieved. Typically, this refers to retrieval from local storage. The data is then played (decoded) using the codec at module 530.

An alternate method involves determining available codecs in advance, selecting a compatible data file, and downloading that data file. FIG. 5B illustrates another embodiment of a process of retrieving and playing encoded data. Process 550 includes detecting available codecs, retrieving compatible data, determining if the compatible data is available, playing the data with a local codec if possible, and signaling an error if not.

Process 550 begins with detecting available codecs at module 560. Based on the codecs available, a compatible data file (in an appropriate predetermined format) is retrieved at module 565 (if possible). At module 570, a determination is made as to whether the data in question was available. If not, the process signals an error at module 575. If so, then at module 580, the retrieved data is played using a locally available codec.

Figure 6:
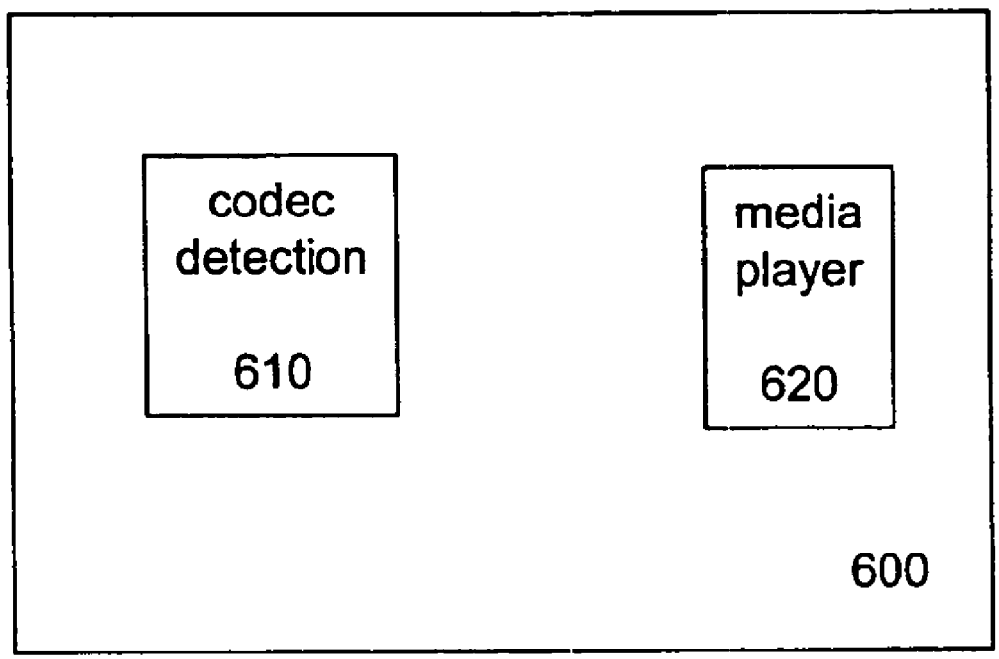
FIG. 6 illustrates an embodiment of a medium including a media player and codec detector.

Typically, a codec detector can be integrated with a media player. FIG. 6 illustrates an embodiment of a medium including a media player and codec detector. Medium 600 represents a machine-readable medium, which may take various forms as described below, and may be singular or plural. Media player module 620 is a media player as may be available from Macromedia of San Francisco, Calif., for example. Codec detection module 620 is a module useful for determining which codecs are available on a personal device such as a cellular telephone. Module 620 may operate by simply surveying the codecs found on the cellular telephone, for example. Note that the illustration of medium 600 does not represent a complete system, it only represents parts of a system useful to illustrate use of local codecs in conjunction with references to media in content files played by a media player. Other portions of such a system are not illustrated to avoid complicating the discussion.

Figure 7:
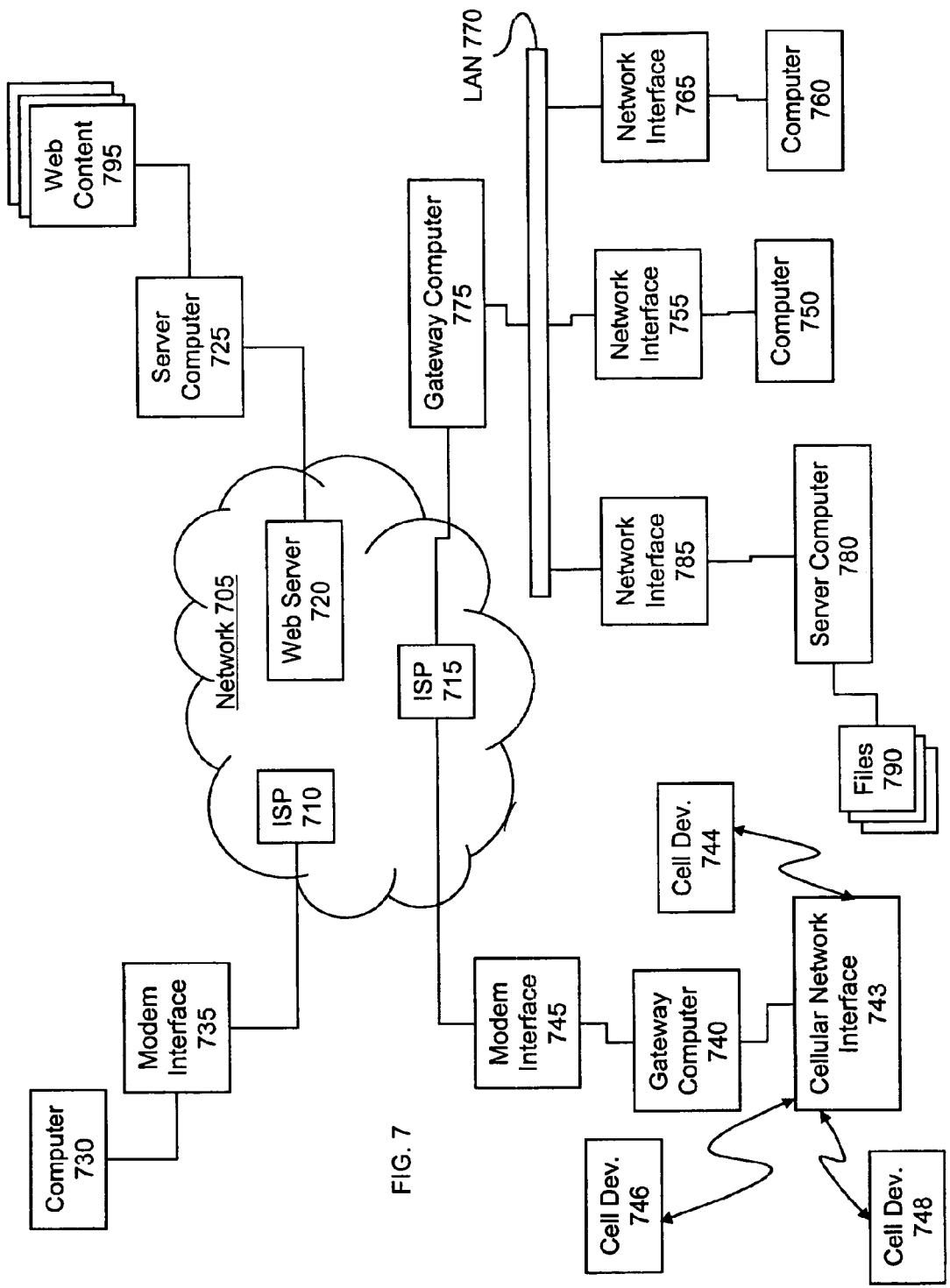
FIG. 7 illustrates an embodiment of a network.
Figure 8:
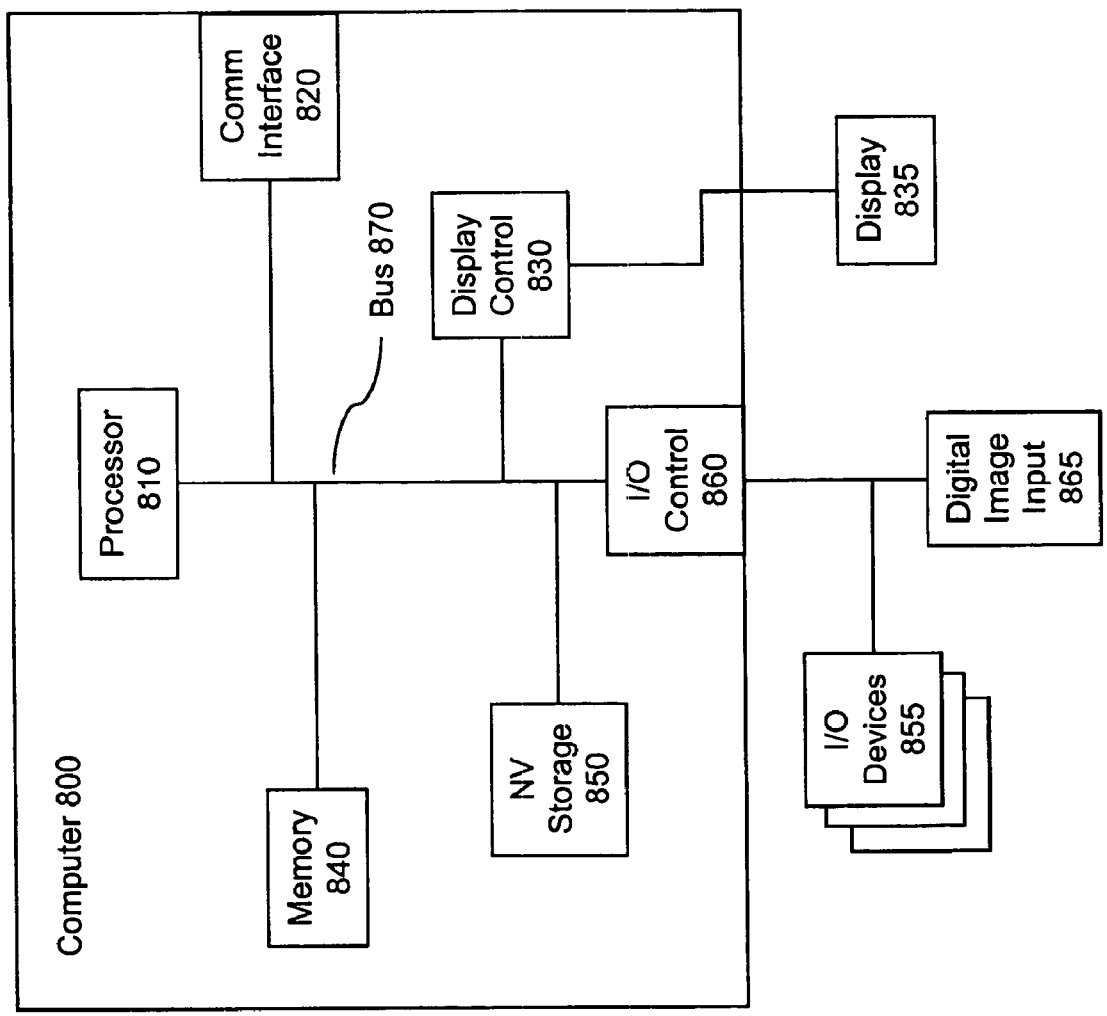
FIG. 8 illustrates an embodiment of a personal device.

The following description of FIGS. 7-8 is intended to provide an overview of device hardware and other operating components suitable for performing the methods of the invention described above and hereafter, but is not intended to limit the applicable environments. Similarly, the hardware and other operating components may be suitable as part of the apparatuses described above. The invention can be practiced with other system configurations, including personal computers, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 7 shows several computer systems that are coupled together through a network 705, such as the internet, along with a cellular network and related cellular devices. The term "internet" as used herein refers to a network of networks which uses certain protocols, such as the tcp/ip protocol, and possibly other protocols such as the hypertext transfer protocol (HTTP) for hypertext markup language (HTML) documents that make up the world wide web (web). The physical connections of the internet and the protocols and communication procedures of the internet are well known to those of skill in the art.

Access to the internet 705 is typically provided by internet service providers (ISP), such as the ISPs 710 and 715. Users on client systems, such as client computer systems 730, 750, and 760 obtain access to the internet through the internet service providers, such as ISPs 710 and 715. Access to the internet allows users of the client computer systems to exchange information, receive and send e-mails, and view documents, such as documents which have been prepared in the HTML format. These documents are often provided by web servers, such as web server 720 which is considered to be "on" the internet. Often these web servers are provided by the ISPs, such as ISP 710, although a computer system can be set up and connected to the internet without that system also being an ISP.

The web server 720 is typically at least one computer system which operates as a server computer system and is configured to operate with the protocols of the world wide web and is coupled to the internet. Optionally, the web server 720 can be part of an ISP which provides access to the internet for client systems. The web server 720 is shown coupled to the server computer system 725 which itself is coupled to web content 795, which can be considered a form of a media database. While two computer systems 720 and 725 are shown in FIG. 7, the web server system 720 and the server computer system 725 can be one computer system having different software components providing the web server functionality and the server functionality provided by the server computer system 725 which will be described further below.

Cellular network interface 743 provides an interface between a cellular network and corresponding cellular devices 744, 746 and 748 on one side, and network 705 on the other side. Thus cellular devices 744, 746 and 748, which may be personal devices including cellular telephones, two-way pagers, personal digital assistants or other similar devices, may connect with network 705 and exchange information such as email, content, or HTTP-formatted data, for example. Cellular network interface 743 is coupled to computer 740, which communicates with network 705 through modem interface 745. Computer 740 may be a personal computer, server computer or the like, and serves as a gateway. Thus, computer 740 may be similar to client computers 750 and 760 or to gateway computer 775, for example. Software or content may then be uploaded or downloaded through the connection provided by interface 743, computer 740 and modem 745.

Client computer systems 730, 750, and 760 can each, with the appropriate web browsing software, view HTML pages provided by the web server 720. The ISP 710 provides internet connectivity to the client computer system 730 through the modem interface 735 which can be considered part of the client computer system 730. The client computer system can be a personal computer system, a network computer, a web tv system, or other such computer system.

Similarly, the ISP 715 provides internet connectivity for client systems 750 and 760, although as shown in FIG. 7, the connections are not the same as for more directly connected computer systems. Client computer systems 750 and 760 are part of a LAN coupled through a gateway computer 775. While FIG. 7 shows the interfaces 735 and 745 as generically as a "modem," each of these interfaces can be an analog modem, isdn modem, cable modem, satellite transmission interface (e.g. "direct PC"), or other interfaces for coupling a computer system to other computer systems.

Client computer systems 750 and 760 are coupled to a LAN 770 through network interfaces 755 and 765, which can be ethernet network or other network interfaces. The LAN 770 is also coupled to a gateway computer system 775 which can provide firewall and other internet related services for the local area network. This gateway computer system 775 is coupled to the ISP 715 to provide internet connectivity to the client computer systems 750 and 760. The gateway computer system 775 can be a conventional server computer system. Also, the web server system 720 can be a conventional server computer system.

Alternatively, a server computer system 780 can be directly coupled to the LAN 770 through a network interface 785 to provide files 790 and other services to the clients 750, 760, without the need to connect to the internet through the gateway system 775.

FIG. 8 shows one example of a personal device that can be used as a cellular telephone (744, 746 or 748) or similar personal device. Such a device can be used to perform many functions depending on implementation, such as telephone communications, two-way pager communications, personal organizing, or similar functions. The computer system 800 interfaces to external systems through the communications interface 820. In a cellular telephone, this interface is typically a radio interface for communication with a cellular network, and may also include some form of cabled interface for use with an immediately available personal computer. In a two-way pager, the communications interface 820 is typically a radio interface for communication with a data transmission network, but may similarly include a cabled or cradled interface as well. In a personal digital assistant, communications interface 820 typically includes a cradled or cabled interface, and may also include some form of radio interface such as a Bluetooth or 802.11 interface, or a cellular radio interface for example.

The computer system 800 includes a processor 810, which can be a conventional microprocessor such as an Intel pentium microprocessor or Motorola power PC microprocessor, a Texas Instruments digital signal processor, or some combination of the two types or processors. Memory 840 is coupled to the processor 810 by a bus 870. Memory 840 can be dynamic random access memory (dram) and can also include static ram (sram), or may include FLASH EEPROM, too. The bus 870 couples the processor 810 to the memory 840, also to non-volatile storage 850, to display controller 830, and to the input/output (I/O) controller 860. Note that the display controller 830 and I/O controller 860 may be integrated together, and the display may also provide input.

The display controller 830 controls in the conventional manner a display on a display device 835 which typically is a liquid crystal display (LCD) or similar flat-panel, small form factor display. The input/output devices 855 can include a keyboard, or stylus and touch-screen, and may sometimes be extended to include disk drives, printers, a scanner, and other input and output devices, including a mouse or other pointing device. The display controller 830 and the I/O controller 860 can be implemented with conventional well known technology. A digital image input device 865 can be a digital camera which is coupled to an i/o controller 860 in order to allow images from the digital camera to be input into the device 800.

The non-volatile storage 850 is often a FLASH memory or read-only memory, or some combination of the two. A magnetic hard disk, an optical disk, or another form of storage for large amounts of data may also be used in some embodiments, though the form factors for such devices typically preclude installation as a permanent component of the device 800. Rather, a mass storage device on another computer is typically used in conjunction with the more limited storage of the device 800. Some of this data is often written, by a direct memory access process, into memory 840 during execution of software in the device 800. One of skill in the art will immediately recognize that the terms "machine-readable medium" or "computer-readable medium" includes any type of storage device that is accessible by the processor 810 and also encompasses a carrier wave that encodes a data signal.

The device 800 is one example of many possible devices which have different architectures. For example, devices based on an Intel microprocessor often have multiple buses, one of which can be an input/output (I/O) bus for the peripherals and one that directly connects the processor 810 and the memory 840 (often referred to as a memory bus). The buses are connected together through bridge components that perform any necessary translation due to differing bus protocols.

In addition, the device 800 is controlled by operating system software which includes a file management system, such as a disk operating system, which is part of the operating system software. One example of an operating system software with its associated file management system software is the family of operating systems known as Windows CE® from Microsoft Corporation of Redmond, Wash., and their associated file management systems. Another example of an operating system software with its associated file management system software is the Palm® operating system and its associated file management system. The file management system is typically stored in the non-volatile storage 850 and causes the processor 810 to execute the various acts required by the operating system to input and output data and to store data in memory, including storing files on the non-volatile storage 850. Other operating systems may be provided by makers of devices, and those operating systems typically will have device-specific features which are not part of similar operating systems on similar devices. Similarly, WinCE® or Palm® operating systems may be adapted to specific devices for specific device capabilities.

Device 800 may be integrated onto a single chip or set of chips in some embodiments, and typically is fitted into a small form factor for use as a personal device. Thus, it is not uncommon for a processor, bus, onboard memory, and display/i-o controllers to all be integrated onto a single chip. Alternatively, functions may be split into several chips with point-to-point interconnection, causing the bus to be logically apparent but not physically obvious from inspection of either the actual device or related schematics.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-roms, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

Figure 9:
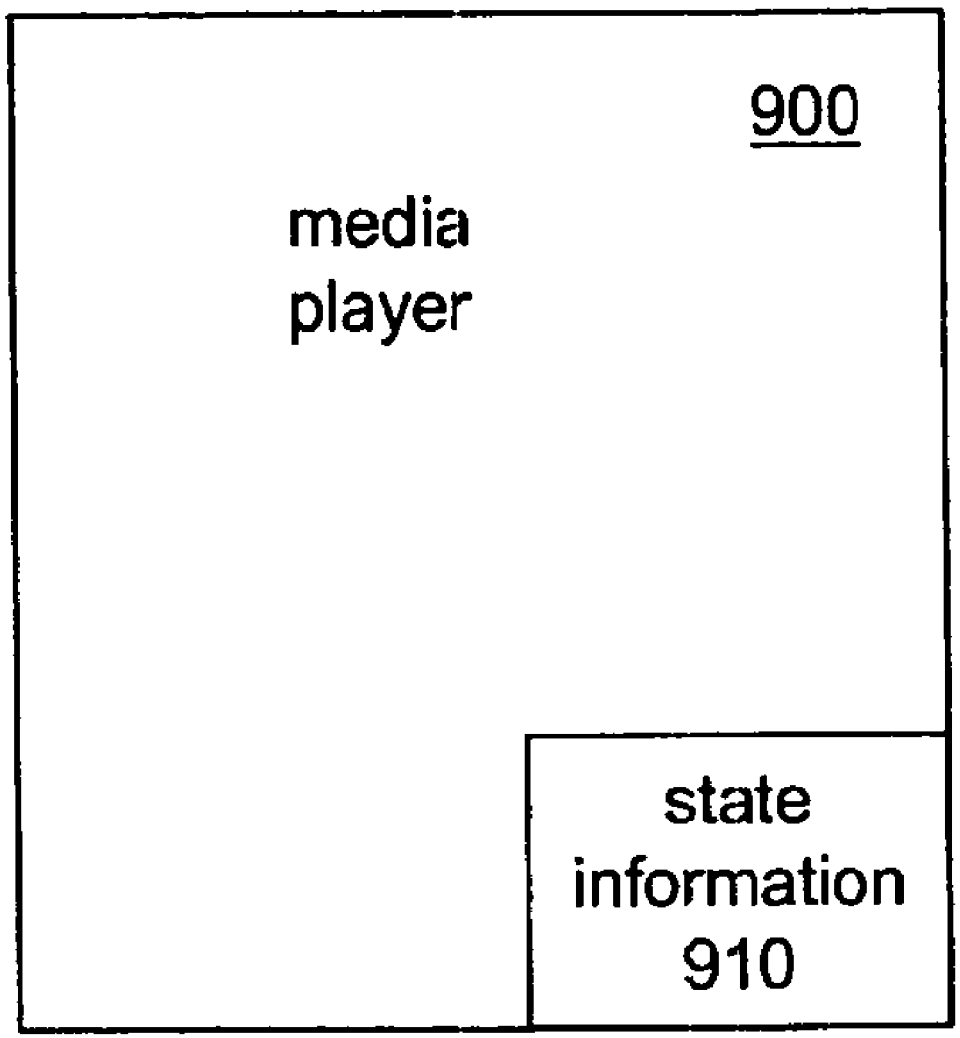
FIG. 9 illustrates an embodiment of a media player.

While the various structures and implementations of a system using local codecs have been described and illustrated, reference to other aspects of the system may be useful. FIG. 9 illustrates an embodiment of a media player. Media player 900, as implemented on a cellular telephone, typically will not have the option of storing information in the rest of the telephone's memory. The operating system is likely to strongly enforce boundaries and refuse to execute a write to memory outside the media player. However, state information may be maintained within the media player in a state information module 910. This potentially allows for suspension and resumption of the media player 900 without the need to save state elsewhere in the cellular telephone.

Figure 10:
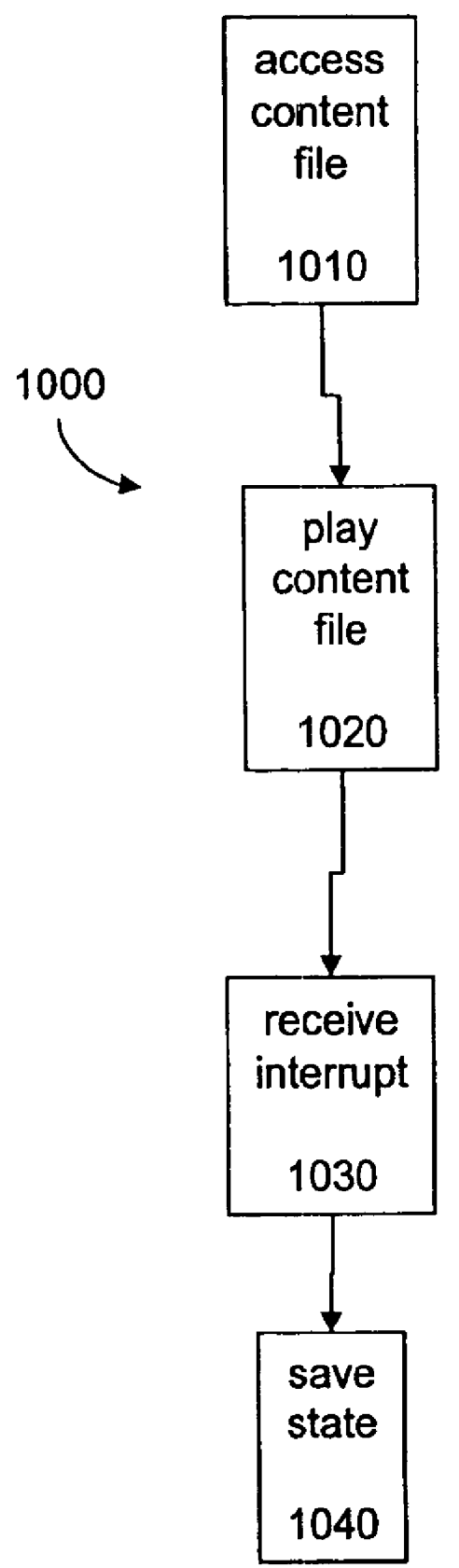
FIG. 10 illustrates an embodiment of a process of interrupting a media player on a cellular telephone.

A process of suspending a media player may further assist in understanding. FIG. 10 illustrates an embodiment of a process of interrupting a media player on a cellular telephone. Process 1000 includes accessing a content file, playing the content file, receiving an interrupt, and saving state of the media player.

Thus, a media player may access a content file at module 1010 to play that content file. At module 1020, the content file may actually be played, with the media player running until interrupted. At module 1030, the media player may receive an interrupt, requiring it to pass control of the cellular telephone elsewhere (such as the operating system to handle a call). At module 1040, state information about what the media player was accessing is saved in the media player, allowing for quick retrieval and accurate information after the interrupt is handled.

Figure 11:
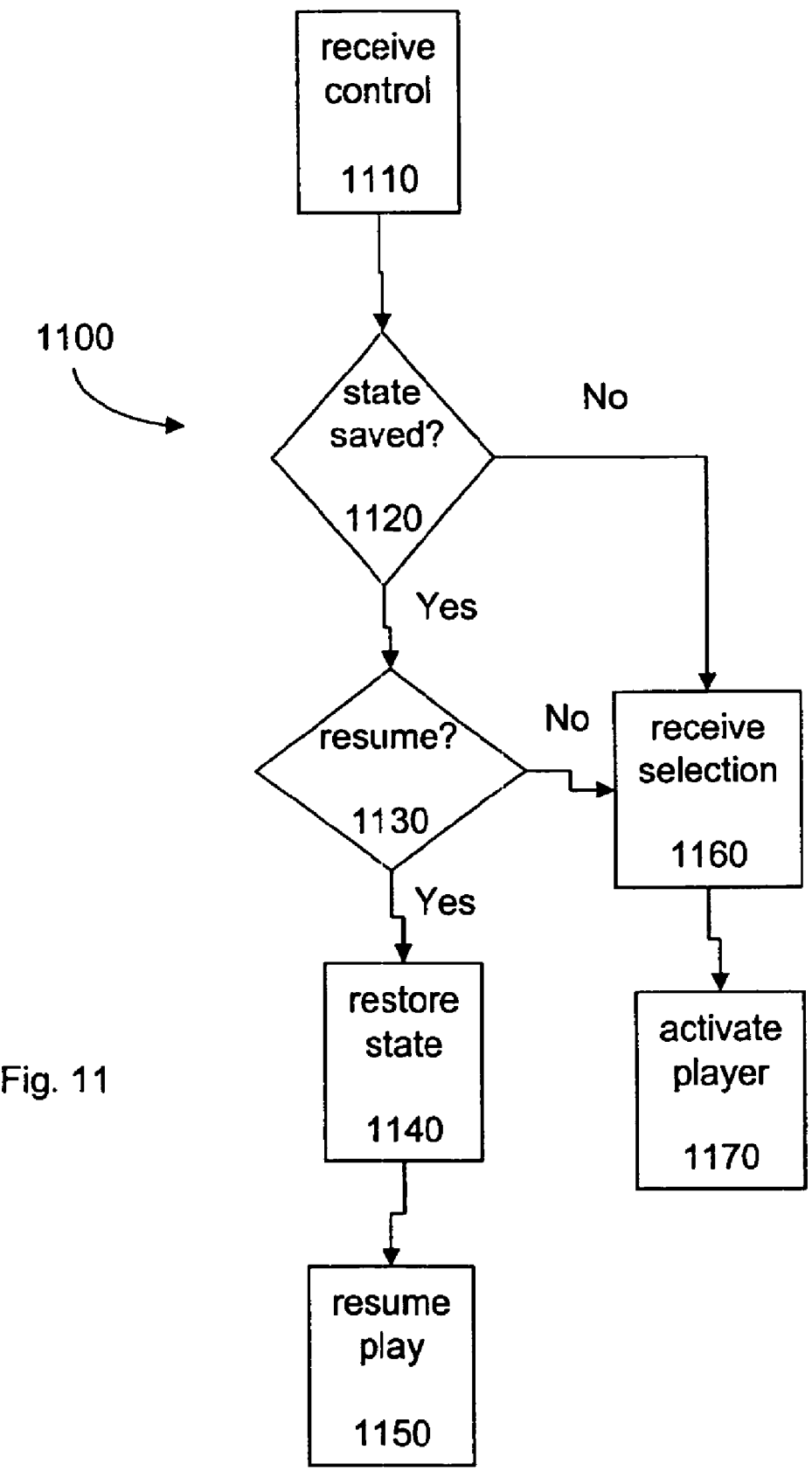
FIG. 11 illustrates an embodiment of a process of operating a media player on a cellular telephone.

After the interrupt is handled, the media player may be restarted. FIG. 11 illustrates an embodiment of a process of operating a media player on a cellular telephone. The media player may or may not have state saved from prior execution. Thus, it must be determined whether to resume or start anew in process 1100.

At module 1110 of process 1100, the media player receives control from the operating system or other program on a cellular telephone. At module 1120, a determination is made as to whether state information was saved for the media player. If yes, then at module 1130, a determination is made as to whether to resume the prior execution based on the saved state. This determination may involve prompting a user for a decision, for example. Thus, a user with a saved video game may prefer to resume, whereas a user reviewing a short animation may prefer to start anew.

If the decision is made to resume, at module 1140, the state from prior execution as stored in the media player is restored. At module 1150, play is resumed. If the decision is to start fresh, then the selection of a content file is received at module 1160, indicating what is to be played. At module 1170, the media player is activated with the selected content file to play. When state is saved and restored (at module 1140, for example), an identifier of the content file is typically saved as part of the state data.

Features and aspects of various embodiments may be integrated into other embodiments, and embodiments illustrated in this document may be implemented without all of the features or aspects illustrated or described. One skilled in the art will appreciate that although specific examples and embodiments of the system and methods have been described for purposes of illustration, various modifications can be made without deviating from the spirit and scope of the present invention. For example, embodiments of the present invention may be applied to many different types of databases, systems and application programs. Moreover, features of one embodiment may be incorporated into other embodiments, even where those features are not described together in a single embodiment within the present document. Accordingly, the invention is described by the appended claims.

What is claimed is:
1. A method, comprising:
   executing a content file on a telephone;
   receiving an interrupt event from an operating system on the telephone, the interrupt event indicating receipt of a signal originating from other than user input to the telephone; and saving state data on the telephone, wherein the state data indicates information about the content file when the interrupt event is received and saving the state data includes saving information regarding an execution point of the file corresponding to a time that the interrupt event is received.

2. The method of claim 1, wherein the signal is one of a telephone call, a message or a notification.

3. The method of claim 1, wherein executing the content file includes executing one of video, audio or image content.

4. The method of claim 1, wherein the content file is executed by a media player.

5. The method of claim 4, wherein the signal originates from an application other than the media player.

6. The method of claim 1, further comprising:
completing handling of the interrupt event; and
accessing the content file on the telephone in response to completing handling the interrupt event.

7. A system, comprising:
a telephone including a processor and an operating system; and
a local storage device on which instructions are stored, wherein the local storage device is coupled to the processor and the instructions are operable to cause the processor to perform operations comprising:
executing a content file on the telephone;
receiving an interrupt event from the operating system on the telephone, the interrupt event indicating receipt of a signal originating from other than user input to the telephone; and
saving state data in the media player, wherein the state data indicates information about the content file when the interrupt event is received and saving the state data includes saving information regarding an execution point of the file corresponding to a time that the interrupt event is received.

8. The system of claim 7, further comprising a media player, wherein the media player is configured to execute the content file.

9. The system of claim 7, further comprising a set of content files embodied in the local storage device.

10. The system of claim 9, further comprising means for receiving a response to a query from a user.

11. The system of claim 9, further comprising a user input interface coupled to the processor, wherein executing the content file includes presenting one of video, audio or image content to the user on the user input interface.

12. A computer program product tangibly embodied in a non-transitory machine-readable medium for interrupting and resuming a media player on a cellular telephone having an operating system, the product comprising instructions operable to cause one or more data processing apparatus to perform operations comprising:
executing a content file on a telephone;
receiving an interrupt event from an operating system on the telephone, the interrupt event indicating receipt of a signal originating from other than user input to the telephone; and
saving state data on the telephone, wherein the state data indicates information about the content file when the interrupt event is received and saving the state data includes saving information regarding an execution point of the file corresponding to a time that the interrupt event is received.

13. The computer program product of claim 12, wherein the signal is one of a telephone call, a message or a notification.

14. The computer program product of claim 12, wherein executing the content file includes executing one of video, audio or image content.

15. The computer program product of claim 12, wherein the content file is executed by a media player.

16. The computer program product of claim 15, wherein the signal originates from an application other than the media player.

17. The computer program product of claim 12, wherein the operations further comprise:
completing handling of the interrupt event; and
accessing the content file on the telephone in response to completing handling the interrupt event.

* * * * *